United States Patent [19]

Hings

[11] 3,861,558
[45] Jan. 21, 1975

[54] CONTAINER COVER ASSEMBLY

[75] Inventor: Donald Paul Hings, Burnaby, B. C., Canada

[73] Assignees: Blythe T. Rogers, Vancouver, British Columbia, Canada; William R. Page; Robert F. Russell, both of Chicago, Ill. ; part interest to each

[22] Filed: Oct. 23, 1973

[21] Appl. No.: 408,657

[52] U.S. Cl. .............................. 220/200, 220/24
[51] Int. Cl. ........................................ B65d 51/00
[58] Field of Search ..... 220/24, 55 R, 55 AN, 55 P, 220/85 R, 85 E, 94 R, 94 A, 95, 96, 55.7; 214/38, 40

[56] References Cited
UNITED STATES PATENTS

| | | | |
|---|---|---|---|
| 2,319,147 | 5/1943 | Mason | 220/95 |
| 2,998,276 | 8/1961 | Shettler | 220/55.7 |
| 3,363,924 | 1/1968 | Remig | 220/55.7 |

Primary Examiner—William I. Price
Assistant Examiner—R. E. Hart
Attorney, Agent, or Firm—Carver and Company

[57] ABSTRACT

Container cover assembly having lifting lug secured to light weight reinforced plastic cover member. Lug is U-shaped tube having longitudinal bore and two spaced legs terminating at ends. Cover member has two openings spaced at distance equal to spacing of ends of lugs, so that when lug is fitted to cover member, ends of legs are in register with openings in member. Cover has longitudinal and transverse stiffeners bonded to lower surface of cover adjacent holes. Plurality of reinforcing filaments bonded together in settable resin extend through bore of tube and through openings in the member. The filaments fan out of openings and are bonded together and to the stiffener to diffuse loads gradually into stiffener. U-shaped tube is supported against lateral movement by similar second U-shaped tube, similarly bonded to cover member, both U-shaped tubes being secured together adjacent center portions. Tubes provide stiffness and protect fibers against abrasion.

10 Claims, 6 Drawing Figures

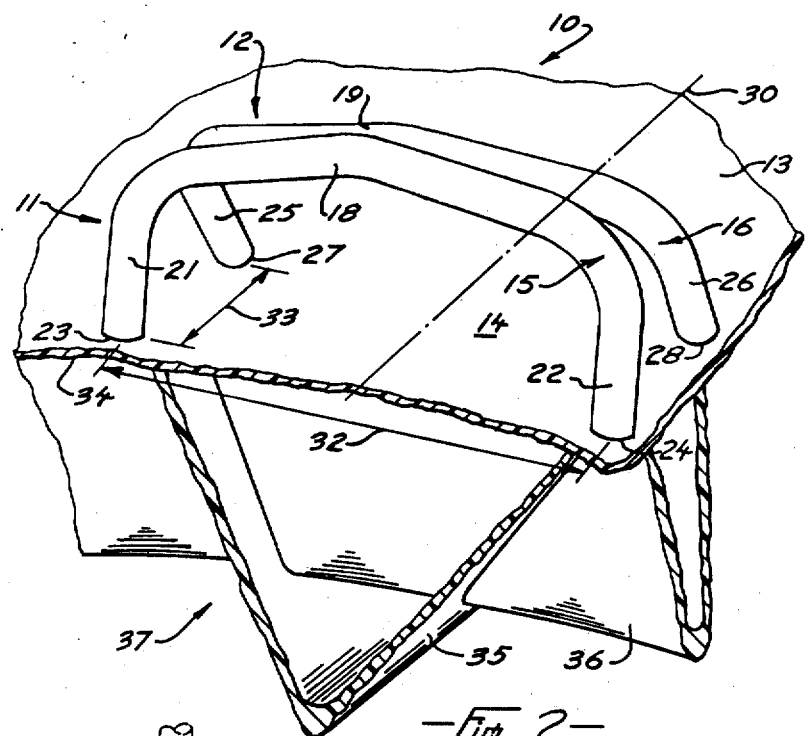
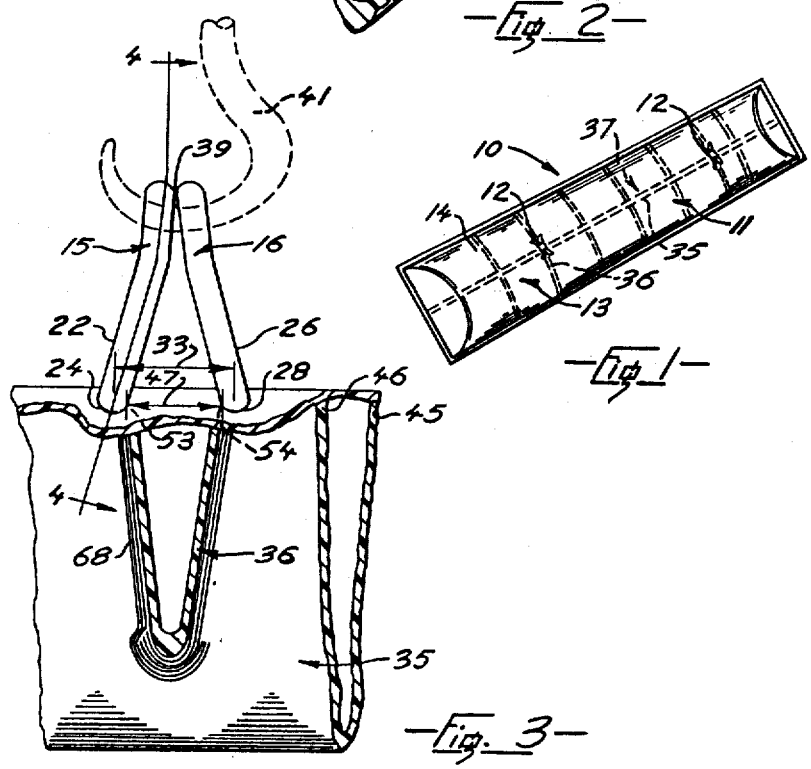

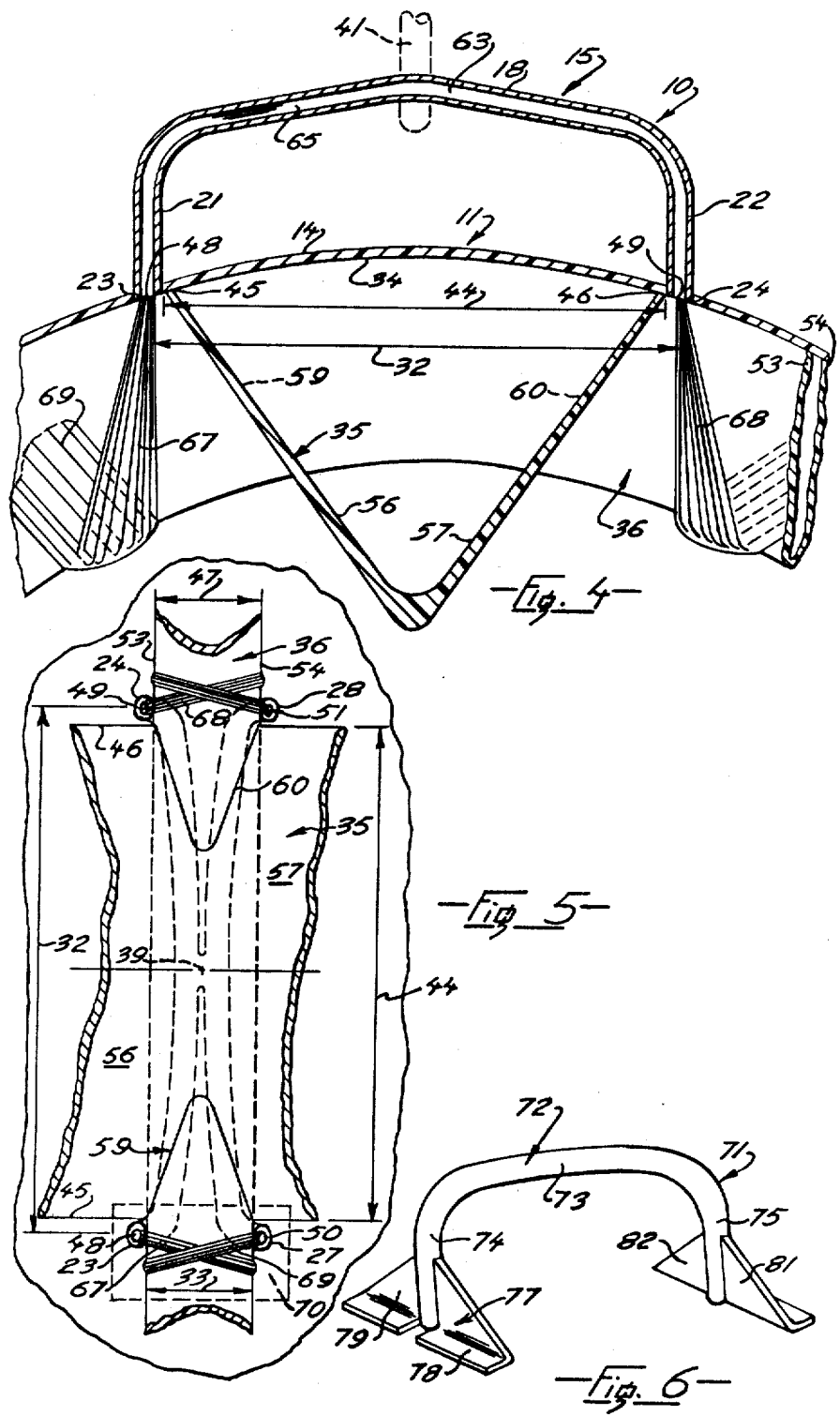

CONTAINER COVER ASSEMBLY

BACKGROUND OF THE INVENTION

1. Field of the Invention

The invention relates to a container cover assembly having a lifting lug, particularly adapted for, but not limited to, use with lightweight glass reinforced plastic freight container covers.

2. Prior Art

A common problem with a glass reinforced plastic structure is in providing a point of attachment for lifting or coupling structures together. Commonly a metal eye bolt is passed through a bore in the structure and is secured to the structure with a washer and nut, suitable glass and resin reinforcing being provided where necessary. However, such coupling often results in premature failure of the area due to stress concentrations around the hole, which concentrations arise from poor distribution of loads from the eye bolt to the reinforced member.

Alternatively a glass reinforced plastic eye or moulded plastic attachment is bonded or mechanically secured to the structure. However such plastic attachments tend to fail in a short time due to the relatively poor abrasion resistance of plastic when in contact with a metal hook. Also fluctuating and shock loads on the plastic attachment during handling tend to produce premature failure of the attachment.

SUMMARY OF THE INVENTION

The invention reduces difficulties of the prior art by providing a cover assembly having joint between the lifting lug and a cover member in which load from the lifting lug is diffused gradually into the member through a compatible reinforcing medium, which medium is simultaneously protected against excessive flexibility by stiffness of the tube.

A container cover assembly according to the invention has a lightweight plastic cover member and a lifting lug secured thereto. The lifting lug includes a rigid tube having a longitudinal bore extending along the length of the tube, the tube being generally U-shaped and having two spaced legs extending to spaced ends, the lug being adapted to be engaged by a lifting device such as a hook. The cover member has two openings spaced apart at a distance equal to spacing between the ends of the tube, so that when the ends of the tube are fitted to the cover member the bores in the ends of the tube are in register with the openings of the member. A plurality of reinforcing fibres having lengths longer than the length of the tube extend through the bores of the tube and through respective openings of the cover member so that ends of the fibres are spaced from ends of the tubes. The fibres fan outwards from the end of the tube adjacent a surface of the member remote from the lug, and embrace an adjacent stiffener. The fibres are embedded in a settable synthetic resin to bond the fibres together and also to the stiffener so that load from the lug is transferred to the fibres and is diffused gradually into the stiffeners and the member so as to reduce stress concentrations. The tube protects the fibres from the lifting device and also stiffens the resin embedded fibres, reducing flexibility of the lug.

A detailed disclosure following, relating to drawings, describes preferred embodiments of the invention, which however is capable of expression in structure other than that particularly described and illustrated.

DESCRIPTION OF THE DRAWINGS

FIG. 1 is a perspective of a container cover assembly according to the invention, FIG. 2 is a fragmented perspective of the cover assembly showing portions of a cover member with a lifting lug, FIG. 3 is a fragmented end elevation of the lug, some portions of the cover member being removed, a portion of a hook being shown, FIG. 4 is a fragmented simplified section on 4—4 of FIG. 3, FIG. 5 is a fragmented plan view of the assembly of FIG. 1 showing a portion of a lower surface of the cover assembly, FIG. 6 is a perspective of an alternative lug.

DETAILED DISCLOSURE

FIGS. 1 AND 2

A container cover assembly 10 according to the invention has a thin reinforced plastic cover member 11 having a periphery complementary to a container (not shown) to be covered. The cover is rectangular and the invention has been found to be well suited for covering open top railroad cars, however other shapes would be selected for other types of containers.

The cover member 11 has a shell 13 having a shallow convex upper surface 14 to increase stiffness and to shed precipitation, the shell being made from glass-reinforced polyester resin such as Uniroyal F-95 (Trade Mark). The assembly 10 has two similar lifting lugs 12, one lug only will be described. The lug has first and second U-shaped tubes 15 and 16 having center portions 18 and 19, the tubes being joined together at the center portions. The tube 15 has two spaced legs 21 and 22 extending from the center portion 18 to ends 23 and 24, and the tube 16 has two similar legs 25 and 26 extending to ends 27 and 28 respectively. The cover member has a central longitudinal axis 30, the ends of the legs being spaced symmetrically thereabouts so as to approach an approximate balance about the axis 30 when the cover assembly hangs from the lugs. Ends of the legs 23 and 24, and 25 and 27 are spaced from each other at an equal transverse spacing 32, and ends of the legs 21 and 25, and 22 and 26 are spaced from each other at an equal longitudinal spacing 33 as shown. The spacings above are measured to undesignated centre-lines of bores of the tubes. Thus the ends of the legs are spaced at corners of a rectangle defined by intersection of parallel lines joining the centrelines of the ends of the legs.

The cover member 11 has a concave lower surface 34, and a plurality of stiffeners bounded to the lower surface to form a stiffener grid 37 (broken lines), to increase stiffness of the shell 13 with a relatively small increase in weight. A portion of a longitudinal stiffener 35 is shown in FIG. 2, the stiffener extending from spaced ends of the cover member and passing between the spaced ends of the legs. A portion of a transverse stiffener 36 is shown intersecting the longitudinal stiffener, the transverse stiffener extending from side edges of the cover. The stiffeners are thus bonded to a surface of the cover member remote from the lifting lug so that the upper surface presents a smooth surface thus reducing accumulation of precipitation.

FIGS. 3 THROUGH 5

As seen in FIG. 3 the tubes 15 and 16 are preferably formed from metal tubing and are joined at 39, suitably by welding, so as to form a rigid assembly adapted to be engaged by a hook 41 which serves as a lifting device, the hook being shown in broken outline. Thus one U-shaped tube serves as a support means cooperating with the cover member to restrain the other U-shaped tube from excessive movement relative to the cover member. As shown in FIGS. 4 and 5 the member 11 has a first pair of openings 48 and 49 having diameters to accept ends of the tubes and are spaced apart at a distance equal to the transverse separation 32 between the ends 23 and 24 of the tubes. The member 11 has a similar second pair of openings 50 and 51 similarly spaced from each other, each opening of the second pair being spaced at the longitudinal separation 33 from an adjacent opening of the first pair of openings. Thus when the four ends of the lug are fitted to the cover member, the end of each leg is in register with an appropriate opening of the member.

As seen in FIGS. 4 and 5 the longitudinal stiffener 35 is a hollow, v-sectioned rib having a width 44 defined by space between inner edges 45 and 46 of the rib, which edges are bonded to the lower surface 34 of the cover member as shown. The width 44 is less than the transverse spacing 32 by an amount dependent on outer diameter of the tubes 15 and 16 so that the stiffener can pass between each opening of each pair of openings, namely between the openings 48 and 49, and between the openings 50 and 51. As seen in FIGS. 3 and 5, the transverse stiffener 36 is a similar hollow V-sectioned rib having a width 47 defined by space between inner edges 53 and 54, which width is similarly dependent on the outer diameter of the ends of the tubes so that the stiffener 36 can pass between adjacent openings of each pair of openings, namely between the openings 49 and 51, and the openings 48 and 50.

As seen in FIGS. 4 and 5, the stiffener 35 has inclined sidewalls 56 and 57 having aligned clearance openings 59 and 60 adjacent the surface 34 to permit the stiffener 36 to pass through the stiffener 35 to extend continuously between the spaced side edges of the cover. Thus each opening in the cover member is spaced outwards from an adjacent corner formed by sidewalls of intersecting stiffeners. Additional stiffeners are provided where required. The stiffeners are all hollow-sectioned glass-reinforced polyester resin mouldings which are bonded with overlays to the shell 13 and to each other at intersections of the stiffeners. The overlays are reinforcing pieces of glass mat and cloth saturated with resin and most of the overlays are not shown.

Referring to FIG. 4, the tube 15 has a longitudinal bore 63 extending along the length of the tube. A plurality 65 of resin-bonded continuous glass fibres or filaments extend through the bore 63 and through the respective openings 48 and 49 adjacent the ends 23 and 24 of the tube. The filaments fan outwards from the openings adjacent the surface 34 to form fan-shaped masses of filaments 67 and 68 which are bonded to each other and to adjacent portions of the stiffener 36. As seen in FIG. 5, the fan-shaped mass 67 from the opening 48 extends to embrace portions of the transverse stiffener 36 adjacent the opening 48 and is also bonded to a similar mass of filaments 69 extending from the opening 50 and the tube 16. Thus filaments from both tubes embrace the stiffener and diffuse load from the lug directly into the stiffener. Note that the filaments are embedded in the polyester resin throughout their length and thus the tube has a resin/glass filament filler. Tensile force in the filaments resulting from load from the hook 41 engaging the lug is diffused gradually into the stiffener and then to the member and thus stress concentration developed by the transfer of the load from the lug to the member is reduced.

The lug 12 is secured to the cover member as follows. The lug is positioned relative to the cover so that ends of the tubes are received in the appropriate openings, end faces of the tubes being approximately flush with the lower surface 34, as seen in FIG. 4. For a U-shaped tube 15 of three-quarters of an inch bore, 60-end continuous glass roving has been found suitable for the plurality of fibres 65. Sixty-five lengths of such roving is folded double about a hook on the end of a flexible wire, (not shown), the roving then being saturated with the polyester resin. The length of wire is then threaded through the bore of the tube and thus passes simultaneously through the openings in the cover member in register with the ends of the tube. The wire is then pulled through the bore 63 drawing the resin-saturated rovings after it. The rovings have sufficient length so that when they are drawn through the tubes approximately eighteen inches of roving extends from each end of the tube. The wire is removed and the loop of roving is cut so as to form one hundred and thirty continuous lengths of glass filaments extending through the tube, which lengths are then fanned outwards as shown to embrace adjacent portions of the stiffener.

A reinforcing overlay 70, periphery of which is shown as a broken line in FIG. 5, bonds the mass of filaments 67 and 69 to the stiffener 36 and protects the filaments from abrasion, corrosion and wicking. The overlay is suitably a layer of chopped strand mat adjacent the masses 67 and 69, covered with a similar sized patch of woven glass cloth or woven roving. Clearly if an alternative arrangement of stiffeners were to be used, the ends of the fibres would fan out from the opening in different directions to embrace the transverse stiffener, or if desired to embrace the longitudinal stiffener also.

ALTERNATIVES AND EQUIVALENTS

Ends of the tubes 15 and 16 are shown to pass through the openings in the cover member so that the end faces are flush with the lower surface. Alternatively the end faces of the tube could be butted against the upper surface 14 of the cover member in which case the openings in the member would have diameters approximately equal to the diameter of the bore of the tube, so that the fibres 55 can pass freely through both the bore of the tube and aligned openings in the member. This alternative is not illustrated.

FIG. 6

An alternative lug 71 has a U-shaped tube 72 having a centre portion 73 and two spaced legs 74 and 75. A bracket 77 extends from the tube at a position adjacent an end of the leg 74, the bracket having flange 78 positioned so as to engage the upper surface of the cover member (not shown) so as to restrict the lug 71 from movement relative to the cover member. A second bracket 79, similar to the bracket 77, is disposed diametrically opposite to the bracket 77 extends similarly from the leg 74 to provide two-way support. Similar brackets 81 and 82 extend from the leg 75, the four brackets serving as support means cooperating with the member, and thus are equivalent to the tube 16 of the lug 12 (FIG. 1).

Other means of restraining movement of one U-shaped tube relative to the member can be provided and are generally equivalent to the above.

I claim:

1. A container cover assembly having a lightweight plastic cover member and a lifting lug in which:
   a. the lifting lug includes a tube having a longitudinal bore extending along length of the tube, the tube being generally U-shaped and having two spaced ends, the lug being adapted to be engaged by a lifting device,
   b. the cover member has a first pair of openings spaced apart at a distance equal to spacing between the ends of the lug so that when the ends of the lug are fitted to the member the bores in the ends of the tube are in register with the openings of the member,
   c. a plurality of reinforcing fibres having lengths longer than the length of the tube extend through the bore of the tube and through respective openings of the cover member, with ends of the fibres spaced from the ends of the tube, the fibres fanning outwards adjacent a surface of the member remote from the lug, the fibres being bonded together and to the member with a settable synthetic resin, so that load on the lug is transferred to the fibres and is diffused gradually into the member so as to reduce stress concentration, and the tube protects the fibres from the lifting device.

2. An assembly as claimed in claim 1 in which the tube of the lug has support means cooperating with the member so as to restrain the lug from excessive movement relative to the member.

3. An assembly as claimed in claim 2 in which the support means includes a bracket extending from the tube at a position adjacent the end, the bracket having a flange to engage the member so as to restrict the lug from movement relative to the member.

4. An assembly as claimed in claim 2 in which:
   i. the support means includes a second U-shaped tube essentially similar to the first U-shaped tube, the two tubes being joined together at the centre portions, spaced legs extending from the respective centre portion to respective ends, the ends of the second tube being spaced from adjacent ends of the first tube,
   (ii) the member has a second pair of openings spaced apart from each other at a spacing equal to spacing between ends of the tubes, each opening of the second pair being spaced apart from an adjacent opening of the first pair of openings at a distance equal to spacing of adjacent ends of the second tube from the first tube, so that when the ends of the lug are fitted to the member, the bores at the ends of both tubes are in register with corresponding openings of the member,
   iii. the second tube has a plurality of reinforcing fibres having lengths longer than the length of the second tube, the fibres extending through the bore of the second tube and through respective openings of the member in register with the ends of the second tube, the fibres fanning outwards adjacent the surface of the member remote from the lug, and being embedded in a settable synthetic resin to bond the fibres to the member similarly to the fibres extending through the first tube.

5. An assembly as claimed in claim 4, in which
   i. the cover member is a glass-reinforced polyester resin shell, and the openings in the member accept the ends of the tubes,
   ii. the lifting lug has a pair of metal tubes welded together at the centre portions thereof,
   iii. the reinforcing fibres are continuous glass roving,
   iv. the fibres are bonded with a polyester resin.

6. An assembly as claimed in claim 4 in which:
   i. each tube has an essentially similar shape,
   ii. the ends of a particular tube are spaced at a transverse spacing from each other,
   iii. adjacent ends of the two tubes are spaced at a longitudinal spacing from each other so that the lug has four ends spaced at corners of a rectangle, and the cover has four openings spaced similarly at corners of the rectangle so as to be in register with the bores of the tubes.

7. An assembly as claimed in claim 6 in which the cover member includes:
   i. a transverse stiffener secured to the member on the surface of the member remote from the lug, the transverse stiffener having a width less than the longitudinal spacing of the adjacent ends of the lug, the stiffening passing between the pairs of openings in the cover,
   ii. a longitudinal stiffener secured to the member on a surface of the member remote from the lug, the stiffener having a width less than the transverse spacing of the ends of the tubes and passing between the openings in the cover of each pair of spaced openings, the stiffener having a transverse clearance opening adjacent the surface of the member remote from the lug, the transverse clearance opening being provided between adjacent openings of each pair of openings and accepting the transverse stiffener extending therethrough to form an intersection of stiffeners, the stiffeners being bonded together at the intersection, each opening in the cover member being spaced outwards from an adjacent corner formed by outer sidewalls of the intersecting stiffeners, the assembly being further characterized by:
   iii. the reinforcing fibres within each tube fanning outwards from appropriate openings in the cover member and embracing adjacent portions of the transverse stiffener so as to diffuse loads into the stiffener.

8. An assembly as claimed in claim 1 in which:
   i. the cover member is a glass-reinforced polyester resin shell, and the openings in the member accept the ends of the tubes,
   ii. the lifting lug is a metal tube,
   iii. the reinforcing fibres are continuous glass roving,
   iv. the fibres in the bore of the tube are bonded with a polyester resin.

9. An assembly as claimed in claim 1 in which:
   i. the cover member has a stiffener secured to the cover member on a surface of the member remote from the lug, the stiffener having a width less than spacing between the openings in the cover member so as to pass between the openings in the cover member, ii. the reinforcing fibres fan outwards from the openings in the cover member and embrace the stiffener so as to diffuse load into the stiffener.

10. An assembly as claimed in claim 1 in which a protective reinforcing patch is bonded over ends of the fibres extending from the tubes to augment bonding of the fibres to the member and to protect the fibres.

* * * * *